Patented Sept. 7, 1943

2,328,573

UNITED STATES PATENT OFFICE 2,328,573

SLAKABLE LIME IN PEBBLE FORM AND METHOD OF PRODUCING THE SAME

Charles L. Montgomery, West Rutland, Vt., and Richard D. Cheesman, Allentown, Pa.; said Montgomery assignor to Vermont Marble Company, Proctor, Vt., a corporation of Vermont; said Cheesman assignor to Traylor Engineering and Manufacturing Company, Allentown, Pa., a corporation of Delaware No Drawing. Application November 13, 1940, Serial No. 365,542

20 Claims. (Cl. 106—78)

This invention relates to slakable lime and to the manufacture thereof from natural limestone, more particularly to the manufacture of slakable lime in the form known in the trade as "pebble lime," and is concerned with the production of slakable lime in pebble form from natural limestone and more particularly from certain varieties of limestone and also from limestone dust, limestone chips, and waste limestone heretofore regarded as unsuitable for pebblizing.

According to a prior practice of producing pebble lime, limestone is broken up into lumps usually varying from about ⅛" to 2½" in size and in such form is burned or calcined, usually in a rotary kiln, to drive off the carbon dioxide, emerging from the kiln in the same lump form, known in the trade as "pebbles" of calcium oxide; these lime pebbles are of approximately the size of the original lumps of limestone introduced into the kiln. Certain grades or kinds of limestone, such as those of a so-called crystalline structure, commonly found in New England and upon the Pacific coast and elsewhere, are unsuitable for treatment according to the just stated practice because the lumps of such stone disintegrate at calcining temperatures. For example, when New England limestone is passed through a rotary kiln in sizes up to about 2½" it breaks down to approximately the size of granulated sugar. And while the practice among lime producers utilizing this kind of limestone differs somewhat, some utilizing various sizes of rock up to, for example, 2½" and others crushing the limestone to a uniform state of subdivision, the resulting calcined product is granular, is of approximately the same physical characteristics, and fails to satisfy certain industrial demands or requirements.

An important object of our invention is to provide a method of making slakable pebble lime from limestone of kinds which have heretofore not been capable of use as a source of lime in pebble form, and more particularly from so-called crystalline limestone which, for reasons not now definitely known or understood but probably attributable to its internal crystalline structure, disintegrates when heated for calcining purposes.

Another object is to provide a method of producing from limestone slakable lime in pebble form that will be efficient in practice, economical, and capable of being readily and inexpensively carried on in practice. Another object is to provide a method of the just stated character that can be readily adapted or carried out on a quantity production basis.

Another object is to provide from limestone, particularly those kinds which have heretofore not been capable of use as a source of lime in pebble form, a slakable lime in pebble form that will have good or improved slakability, that will have improved suitability for certain practical uses or application, and, more particularly, that will be better suited for such fields of application where pebble lime is desirable. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In carrying on the method of our invention, we start with limestone in a finely divided condition, preferably achieved by grinding. Because of variations in size of the visible crystals of different varieties of limestone, the degree of reduction or division will depend to some extent upon the character of the limestone employed. A satisfactory range of reduction or pulverizing may be between a minimum of 50% passing through a 60-mesh screen and a maximum of 100% passing through a 300-mesh screen. Preferably, the subdivision of the limestone is carried to, or closely approaching, the point of pulverization, and, generally stated, the finer the grinding the better.

To the pulverized limestone there is added and mixed therewith, preferably during the grinding operation, and either in a wet or dry condition, a controlled amount of a bonding agent of a nature more particularly set forth hereinafter and which illustratively may comprise a soluble alkali metal silicate, such as water glass.

The resulting mixture is then passed through a rotary kiln and subjected to heat treatment and to the mechanical action that results from the rotation of the kiln. The kiln temperature is selected to bring about a reaction between the added bonding agent, such as the above-mentioned water glass, and the minute particles of the limestone, a reaction which, accompanied by the agitation or mechanical action caused by the rotation of the kiln in tumbling the particles of the mixture about, under the accompanying heat treatment, causes the particles to cohere and to build up in the form of balls or pebbles; depending upon various factors, the size of the resultant pebbles, for example, on the order of 1½", thus produced is controllable. Continuing through the kiln decomposition of the limestone particles, that is, the driving off of the carbon dioxide, proceeds, the balls or pebbles of lime emerging from the discharge end of the kiln.

The pebbles of lime thus produced are less dense or more porous than lime produced according to such prior practices as those earlier above mentioned. Thus, for example, according to one of the above-mentioned prior practices of producing granular lime, crushed limestone weighing about ninety pounds per cubic foot produces granular lime weighing about sixty-eight pounds per cubic foot. Crushed limestone weighing about ninety pounds per cubic foot and of the type that is capable of being pebbled according to another of the above-mentioned prior practices, produces pebble lime weighing forty-eight pounds per cubic foot. But the pebble lime produced according to our method, using crushed limestone weighing about ninety pounds per cubic foot, weighs about thirty-eight pounds per cubic foot. These comparative densities show the increased and superior porosity and indicates the different physical structures of the pebble lime resulting from our method. We are unaware of any production heretofore of such low density slakable pebble lime. In connection with the above-stated comparative figures, it should be noted that uncrushed or solid limestone weighs on the order of 170 pounds per cubic foot.

By reason of the microscopically loose association of the particles (as evidenced by the low density of the resultant pebblized lime) constituting the pebbles, they rapidly absorb heat and accelerate the decomposition of the limestone. Thus, when lumps of amorphous limestone are calcined according to prior procedure, the penetration of the heat to the interior of the dense stone and rate of disassociation are comparatively slow and directly proportional to the size of the stone requiring a longer time of exposure to the heat within the kiln, whereas by previously reducing the limestone to small particles and coalescing said particles into pebbles, the heat penetration is more rapid, more uniform and more thorough, because of the voids between the particles forming the pebbles, thus enabling the use of a shorter kiln or, alternatively, allowing the faster travel of material through the kiln.

We are not certain of the exact nature of the above-mentioned reaction that takes place between the added bonding agent and the minute particles of limestone. We believe that, where the bonding agent is water glass, the minute particles of limestone become spotted or coated, apparently very thinly, with a film of the water glass solution and that in being subjected to the heat treatment and the mechanical agitation in the rotary kiln, some interaction between the material of the particles and the water glass takes place to cause the particles to cohere or adhere or otherwise become joined together but apparently in such a way that, probably in coaction also with the evolved carbon dioxide, voids or spaces are formed between and amongst the assembled particles, these voids or spaces apparently being much larger and more numerous than any possible interstices between the particles were the latter simply to be compacted or agglomerated or as occur in natural limestone formations. Where the bonding agent is added in dry form, probably an analogous or similar action takes place. It is probable also that, at some temperature within the kiln, the water and the sodium component of the water glass volatilizes and the silica reacts with the lime to form a cementitious reaction product suitable for connecting or joining together the limestone particles under the agitation and tumbling motion imparted to them by the kiln and which, probably also aided by the evolution of carbon dioxide from the limestone particles, expands to increase the spaces or voids between the particles. The bonding agent, as we believe, is thus also prevented from glazing over and sealing the interstices between the particles and is also prevented from penetrating or impregnating the particles themselves.

Furthermore, the resultant pebble lime has good slaking qualities and slakes actively, producing a slaked lime which is uniformly free from grit or gritty particles, a factor of substantial advantage in practical use of the material. We believe that these advantages follow because the minute limestone particles, when in the kiln, are more readily or easily and also uniformly calcined and because the bonding agent, while securely holding the collected calcined particles together in pebble form of the desired size is of such a nature that, during the slaking, it probably is of itself decomposed or mechanically disintegrated under the action of slaking.

We have found that good results of the above-mentioned nature are achieved by suitable control of the amount of bonding agent and apparently the proportion of added agent has a bearing upon the character of action that takes place and upon the result achieved. In amount it should not be present in such quantity as would, for example, glaze over the particles, or, for example, as would materially affect the chemical composition of the lime nor should its amount be so large as to detrimentally affect the slaking qualities of the ultimate product. Where the binding agent is a silicate, such as water glass, we have achieved good results where the latter is added in such a quantity that the proportion of silica to the limestone particles is on the order of from a fraction of 1% to 2½%, by weight, depending upon the particular grade or kind of limestone employed. It will be understood, however, that the amount of additive binding agent may be varied according also to other factors; for example, among the factors affecting the size of the ultimate pebbles is the amount of the additive agent. Thus, other factors being the same, such as the loading of the kiln, uniformity of initial mixture, and the speed or rate of treatment in the kiln, the size of the balls or pebbles produced may be increased by increasing the amount of additive agent. Thus, for example, using a grade of Vermont limestone, analyzing about 98% $CaCo_3$, and with an additive silica content of 0.375%, we have achieved good results in producing pebbles of a size on the order of 1".

As above noted, the amount of bonding agent added may be varied. Where the bonding agent is a silica-containing compound that adds silica to the limestone, as in the case of the water glass above-mentioned, it will be understood that the amount of silica added to the limestone prior to calcining is with regard to the silica naturally occurring in the limestone and which investigation has shown enters into the reaction, if at all, only to a negligible extent. The silica preferably is introduced in the form of an alkali metal silicate, although in the case of certain grades of limestone rich in silica, we may add an alkali metal oxide, hydrate or carbonate which will combine with the silica in the limestone to furnish an alkali metal silicate suitable for the reaction. Or it may be possible that it combines directly with the calcium to form calcium silicate.

As above indicated, where the limestone contains silica naturally, the silica content may be made to take part in the bonding together of the particles. Thus, for example, the addition of a suitable base, such as one taken from the alkali metal group or one taken from the alkaline earth group, forms a carbonate of that base, the carbon dioxide, abundantly present from combustion in the kiln, being available for this reaction; the forming of the carbonate of the base frees the hydro-silicic acid which in turn becomes the active agent for the formation of the calcium silicate binder. A generally similar action takes place in the case of the above-mentioned water glass which, available on the market in various forms or compositions, is suitable for purposes of our method where it furnishes an agent for the above-mentioned reaction. While we prefer to employ alkali metal silicates as the added binding agent, it is within the contemplation of our invention, as above indicated, to employ other silicates, or to employ ingredients that will also bring into reaction, as above indicated, silica naturally contained in such suitable grades of limestone as are silica-bearing; various other silicates are inferior to the silicates of the alkali metal group either in the dry state or in solution and introduce undesirable factors, during the carrying on of the process, such as fluxing, clinkering, or the like, and more easily controllable and better results are more efficiently achieved by employing the latter.

The kiln temperature may, in general, be on the order of that employed in calcining limestone and may range from around 1800° F. to 3000° F. It is probable that, at the entry end of the kiln where actual temperatures may be somewhat lower, since that is the "cold" end of the kiln, the temperature may not be sufficient to commence calcining the limestone particles but it is our observation that the temperature is sufficient to make the additive bonding agent active during the rolling tumbling action to commence building the particles up into pebbles, this action continuing as the material continues to move through the pre-calcining section of the kiln into higher ranges of temperature within the kiln and continue to move toward the discharge end, the calcining of the limestone particles taking place uniformly throughout.

The temperatures employed may also be varied according to circumstances, for example, depending upon the chemical and physical analysis of the limestone treated. For example, magnesium carbonate disassociates at a lower temperature than calcium carbonate and hence lower temperatures would be employed where the limestone contained magnesium carbonate. The upper limit or limits of temperature are carried at a level sufficiently above the disassociation temperature to cause disassociation to take place fast enough to be economical but not sufficiently high to cause a fluxing, melting or shrinking action on the limestone particles.

As a specific example of one mode of carrying out our method, Vermont marble of the commonly termed crystalline grade and typical of limestone found in New England was ground in a pulverizer to a size such that 90% passed through a 200-mesh screen and during grinding an aqueous solution of water glass marketed under the designation "Type N" by the Philadelphia Quartz Company and having the formula $Na_2SiO_3$ was uniformly intermingled or mixed therewith. This water glass was of the following composition:

| | Per cent |
|---|---|
| $Na_2O$ | 8.9 |
| $SiO_2$ | 28.7 |
| Water | 62.4 |

The above water glass solution was added in the proportion of 2½ gallons (23 pounds) of the solution per ton of pulverized limestone. The resulting mixture was next passed through an inclined rotary kiln approximating 120' in length and 8' in diameter and internally heated to a temperature of 2500° F. in the combustion zone of the kiln. The rate of feed of the material through the kiln was approximately four tons of mixture per hour, corresponding approximately to the production of two tons of slakable pebble lime per hour. The sizes of the pebbles were approximately 1¼" to 1½" in diameter. Reducing the amount of water glass by one-half, the size of the pebbles was reduced to a size of from ½" to ¾".

We have mentioned above the creating of the voids between the calcined limestone particles. If, for any reason, it were found desirable to increase the percentage and size of the voids, and thus improve the porosity and slaking qualities, we may add to the mixture a suitable amount of a combustible material, preferably organic, such as sawdust, comminuted straw or grain, and the like. Such a material is added in suitable amount, for example, in the proportion of 10 pounds of sawdust per ton of pulverized limestone, and is uniformly distributed throughout and intimately mixed with the above-mentioned mixture of pulverized limestone and bonding agent. This mixture when put through the kiln improves the porosity of the pebbles.

The sawdust accompanying the limestone in the initial stage of its passage through the kiln presumably is prevented from igniting or burning because of a lack of oxygen occasioned by the fact that it is enveloped by the carbon dioxide driven off from the limestone and also by other inert gases developed in the kiln. However, as the partially decomposed limestone reaches the combustion zone of the kiln the organic matter of the sawdust is volatilized leaving minute channels or pores in the resulting pebbles of lime.

It will be understood that the use of sawdust or like organic material in practicing our method is not indispensable to the successful practice of our invention, but it may be noted that its use contributes markedly to certain of the characteristics of the product and makes the resultant slakable lime peculiarly adaptable in certain chemical fields.

It will thus be seen that there has been provided a slakable pebble lime and a method of producing the same in which the various objects heretofore noted, together with many thoroughly practical advantages, are successfully achieved. Quarried or mined limestones of characteristics that have precluded production therefrom of slakable pebble lime are now, according to our invention, available as a source of slakable pebble lime and thus such limestones have opened to them new commercial fields; also limestone dust, limestone chips, and waste limestone, derived from such operations as mining, quarrying, handling or processing limestone may according to our invention be converted into slakable pebble lime, instead of being treated as has heretofore usually been the case as pure waste material. As above indicated, by the term "limestone" as used in this specification and in the following claims is meant natural limestone, such as those illustratively mentioned above, and this specification and the claims are therefore so to be understood and interpreted. The slakable pebble lime produced has many marked advantages some of which have been pointed out or noted above; it might be noted that among these, due to such physical characteristics of the pebble lime abovementioned, is a facility for slaking or activity of reaction with water that at least equals and according to some of the results we have thus far reached, exceeds that of commercial pebble lime heretofore available on the market for industrial, building, chemical, agricultural and other uses. It dependably meets the slaking requirements in such fields of use as just stated.

The present invention is not limited to the specific details of manufacture set forth in the foregoing example, but should be construed as illustrative and not by way of limitation. In view of the various modifications which may be effected therein without departing from the spirit and the scope of this invention, only such limitations should be imputed as are indicated in the appended claims.

We claim:

1. A porous pebble of slakable lime formed from limestone comprising a mass of small particles of calcined lime individually bonded and held together, with intervening pores, by an added silicate-containing bonding agent, said pebble being disintegratable under the action of slaking of the pebble, said porous pebble having a density substantially less than the density of slakable pebble lime that is formed by calcining corresponding pebbles of limestone.

2. A porous pebble of slakable lime formed from limestone comprising minute particles individually bound together, with pores therebetween, by an added alkali metal silicate bonding agent, the ratio of the volume of the pores to the total volume of the pebble being materially greater than the ratio of the volume of pores to the volume of a pebble of slakable pebble lime resulting from calcining corresponding pebbles of limestone, said pebble being disintegratable under the action of slaking of the pebble.

3. A porous pebble of slakable lime formed from limestone comprising a mass of calcined particles of pulverized limestone individually bonded and held together, with intervening pores, by an added silicate-containing bonding agent, said pebble being disintegratable upon slaking of the porous pebble.

4. A porous pebble of slakable lime formed from limestone comprising a mass of minute particles whose volume is less than the volume of the pebble, said particles being bonded one to the other, with intervening pores, by an added cementitious alkali metal silicate bonding agent, the ratio of volume of the pores to the volume of the particles and bonding agent being such as to give the pebble a density on the order of 38 pounds per cubic foot.

5. A porous pebble of slakable lime formed from limestone comprising calcined particles of limestone bound together by an added sodium-silicate product, with voids or spaces between the bound-together calcined particles, said pebble being disintegratable under the action of subsequent slaking of the lime pebble.

6. A porous pebble of slakable lime formed from limestone comprising separate particles of calcined limestone bound together by an added bond that comprises resultant of heat-treated alkali metal silicate, with voids or spaces between the bound-together particles, said pebble being disintegratable under the action of subsequent slaking of the lime pebble.

7. In a process of producing from limestone slakable lime in pebble form, the steps which comprise subjecting pulverized limestone to heat treatment at or below calcining temperature in an atmosphere of carbon dioxide and to a rolling tumbling action while in admixture with a small quantity of a silica-containing compound capable of reaction under the said temperature with calcium or magnesium of the limestone particles to produce a bonding reaction product of calcium silicate or magnesium silicate in an amount to bond the particles together to form pebbles but without impregnating or shrinking the particles or diminishing the voids formed between them, and continuing the heat treatment of the pebbles at suitable calcining temperature to drive off carbon dioxide from the limestone of the bound-together particles.

8. In a process of producing from limestone slakable lime in pebble form, the steps which comprise subjecting pulverized silica-containing limestone to heat treatment at or below calcining temperature in an atmosphere of carbon dioxide and to a rolling tumbling action while in admixture with a small quantity of a compound capable of combining with silica present in the limestone to produce a bonding reaction product of calcium silicate or magnesium silicate in an amount to bond the particles together to form pebbles but without impregnating or shrinking the particles or diminishing the voids formed between them, and continuing the heat treatment of the pebbles at suitable calcining temperature to drive off carbon dioxide from the limestone of the bound-together particles.

9. In a process of producing from limestone slakable lime in pebble form, the steps which comprise subjecting pulverized limestone to a rolling tumbling action while in admixture with a heat-responsive bonding agent which in amount is insufficient under heat treatment to glaze over or impregnate the particles of limestone, subjecting the admixture to heat treatment during said tumbling action to make said agent effective to join tumbling particles together with voids or spaces therebetween and build them up into pebbles, and extending the heat treatment at a calcining temperature to drive off the carbon dioxide from the limestone particles of the pebbles and to cause the binding agent to complete the securing together of the particles and to provide voids or spaces between particles.

10. In a process of producing from limestone slakable lime in pebble form, the steps which comprise bonding together the particles of pulverized limestone in the form of a porous pebble with voids between the particles thereby to increase the rate of heat penetrability and rate of egress of disassociated carbon dioxide throughout the porous structure of the pebble, and subjecting the pebble to calcining temperature to disassociate carbon dioxide from the limestone of said particles.

11. In a process of producing from limestone slakable lime in pebble form, the steps which comprise intimately admixing with limestone in finely divided condition a silica-containing compound in an amount sufficient to bond together the individual particles with voids therebetween, and subjecting said mixture to heat treatment and rolling tumbling action to effect building up of the particles into pebble form and substantially complete decomposition of the limestone.

12. In a process of producing from limestone slakable lime in pebble form, the steps which comprise intimately admixing limestone in a finely divided condition with an alkali metal silicate representing from a fraction of 1% to several percentage based on the weight of the limestone, and subjecting said mixture to a rolling tumbling action and to heat treatment to effect bonding together of the limestone particles to build them up into pebbles and without shrinkage thereof and to provide voids therebetween and to effect calcination of the limestone particles.

13. In a process of producing from limestone slakable lime in pebble form, the steps which comprise intimately admixing limestone in a finely divided condition with an alkali metal silicate in an amount sufficient to cause the limestone particles under heat treatment to bond together in pebble form, and subjecting the resultant mixture to heat treatment to effect bonding together of the limestone particles without shrinkage thereof and to provide voids therebetween and to effect calcination of the limestone particles.

14. In a process of producing from limestone slakable lime in pebble form, the steps which comprise intimately admixing limestone in a finely divided condition with an alkali metal silicate in an amount sufficient to bond together the individual particles, building up the resultant mixture into individual pebbles of limestone particles, and heat treating them at calcining temperature to disassociate carbon dioxide from the limestone of said particles.

15. In a process of producing from limestone slakable lime in pebble form, the steps which comprise reducing the limestone to a finely divided condition, bonding together the resultant particles of limestone in the form of a porous pebble with voids between the particles thereby to increase the rate of heat penetrability and rate of egress of disassociated carbon dioxide throughout the porous structure of the pebble, and subjecting the pebble to calcining temperature to disassociate carbon dioxide from the limestone of said particles.

16. In a process of producing from limestone slakable lime in pebble form, the steps which comprise admixing an alkali metal silicate with finely divided limestone, treating the resultant mixture to bond together the particles of limestone in the form of a porous pebble with voids between the particles thereby to increase the rate of heat penetrability and rate of egress of disassociated carbon dioxide throughout the porous structure of the pebble, and subjecting the pebble to calcining temperature to disassociate carbon dioxide from the limestone of said particles.

17. In a process of producing from limestone slakable lime in pebble form, the steps which comprise admixing sodium silicate with finely divided limestone, treating the resultant mixture to bond together the particles of limestone in the form of a porous pebble with voids between the particles thereby to increase the rate of heat penetrability and rate of egress of disassociated carbon dioxide throughout the porous structure of the pebble, and subjecting the pebble to calcining temperature to disassociate carbon dioxide from the limestone of said particles.

18. In a process of producing from limestone slakable lime in pebble form, the steps which comprise admixing potassium silicate with finely divided limestone, treating the resultant mixture to form a bonding reaction product and thereby bond together the particles of limestone in the form of a porous pebble with voids between the particles thereby to increase the rate of heat penetrability and rate of egress of disassociated carbon dioxide throughout the porous structure of the pebble, and subjecting the pebble to calcining temperature to disassociate carbon dioxide from the limestone of said particles.

19. In a process of producing from limestone slakable lime in pebble form, the steps which comprise admixing with finely divided limestone a silica-containing compound in an amount sufficient to bond together the individual particles with voids therebetween and incorporating a comminuted combustible material with said limestone, and subjecting the resultant mixture to heat treatment to effect bonding together of the limestone particles and to burn off said combustible material to form substantial voids between particles, thereby to increase the rate of heat penetrability and rate of egress of disassociated carbon dioxide throughout the porous structure of the pebble, and to disassociate carbon dioxide from the limestone of said particles.

20. In a process of producing from limestone slakable lime in pebble form, the steps which comprise admixing with finely divided limestone an alkali metal silicate in an amount sufficient to bond together the individual particles with voids therebetween and incorporating a comminuted combustible material with said limestone, and subjecting the resultant mixture to heat treatment to effect bonding together of the limestone particles and to burn off said combustible material to form substantial voids between particles, thereby to increase the rate of heat penetrability and rate of egress of disassociated carbon dioxide throughout the porous structure of the pebble, and to disassociate carbon dioxide from the limestone of said particles.

CHARLES L. MONTGOMERY.
RICHARD D. CHEESMAN.